I. Y. Munn,
Grain Ventilator.
No. 101,759. Patented Apr. 12. 1870.
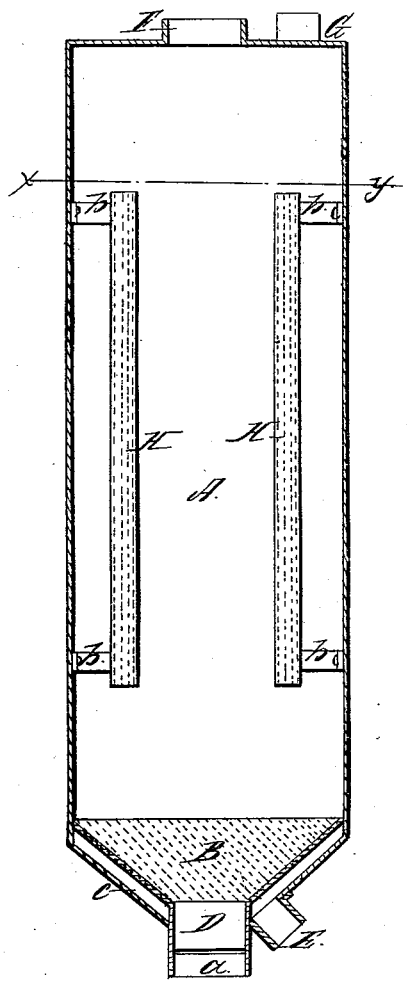
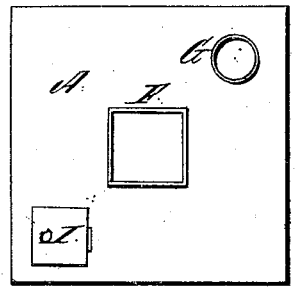
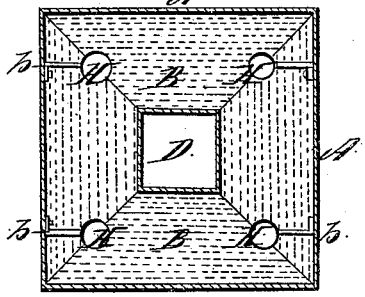
Witnesses:
E. A. West
O. W. Bond.
Inventor:
Ira Y. Munn

United States Patent Office.

IRA Y. MUNN, OF CHICAGO, ILLINOIS.

Letters Patent No. 101,759, dated April 12, 1870.

GRAIN-DRIER.

The Schedule referred to in these Letters Patent and making part of the same.

*To all whom it may concern:*

Be it known that I, IRA Y. MUNN, of the city of Chicago, in the county of Cook and State of Illinois, have invented certain new and useful Improvements in Grain-Drier; and I do hereby declare that the following is a full, clear, and exact description thereof, reference being had to the accompanying drawings, making a part of this specification, in which—

Figure 1 is a vertical section.
Figure 2, a plan or top view.
Figure 3, a horizontal section on the line $x\ y$.

The nature of my invention consists in the peculiar construction and arrangement of the parts of a storage bin for grain and the drying of grain in such a bin, by forcing a current of air through and through a mass of grain while in a state of rest, as is hereinafter more fully described.

Its construction is as follows:

The bin A is made in any convenient form, suitable for the building in which it is to be located. I prefer to have it made with greater depth than breadth, as shown. It is made of wood; wood with metallic lining or of metal, as may be desired, and covered so as to be air-tight or nearly so.

The top is provided with a hole, F, through which the grain is admitted into the bin A, a vent-pipe, G, and a man-hole I.

The holes F and I are provided with covers, which are closely fitted, and, if desired, may be packed to make them tight.

For a bin of the capacity of four thousand five hundred bushels of grain, the openings F and D should be about fifteen inches square.

The tube or opening G may be made round or square, and should be about fifteen inches across or in diameter.

The bottom is made conical or depressed in the middle for convenience in discharging the grain, and is provided with a perforated false bottom, B, which is located about twelve inches above the main bottom, so as to leave an unobstructed space, G, beneath such false bottom.

At the lowest point of the bottom an opening, D, is provided for the discharge of the grain.

This opening is provided with a slide or valve, $a$, to regulate such discharge.

The opening D passes through both bottoms, and is so made that it has no communication with the space C.

To the main bottom I attach, by any suitable means, a pipe-cylinder or opening, E, as shown, which connects directly with the space C.

For corn and other coarse grains this construction of the bin will be sufficient to answer all purposes, but for wheat and other fine grains, I place inside four tubes, H, made of perforated material, as shown in figs. 1 and 3.

These tubes or pipes I usually make about four inches in diameter. They are closed at the top to prevent their being filled with grain, and are inserted for the purpose of aiding or facilitating the passage of air through the bin when filled, and are held in place by the brackets $b$ or by other suitable means, and their number will depend upon the size and shape of the bins, and upon the size of the pipes themselves.

In the form shown four will be sufficient, but it is evident that the number and size may be varied, and also their length, but I prefer them of the length and location shown; but, if desired, they may be brought down near the bottom, and also carried near the top. Under ordinary circumstances, however, it will be found best to have the ends about three feet above the bottom and below the top.

In addition to the materials named for the construction of the bin, brick or stone may be used.

In operation, I apply an air-pump or fan-blower to either of the pipes E or G, as may be most convenient, and in large elevators it will be found most convenient to apply them to the upper end of the lower bins and to the lower end of the upper bins, and thus I force a current of air through the entire bin, either by pressure or suction, or by both at the same time; and, if desired, the air can be heated, by any suitable means, before it enters the bin.

When the current of air is upward, the air is forced or drawn in through the pipe or opening E, and is distributed over the bottom of the bin through the air-space C, and passes through the perforated bottom B into the grain and through the entire mass of the grain, and passes out at the pipe or opening G, carrying with it the vapors and heat from the grain.

When the direction of the current is reversed, the operation is the same, as there is always space enough between the grain and the top of the bin for the distribution of the air, when the bin is called full; and the process works equally well when the bin is only partially filled.

When drying or cooling small grains, and the tubes H are brought into use, the air passes through the grain as before, and a portion of it passes into the tubes, and, passing a portion of the distance in the tubes, is again distributed through the grain, thus insuring a circulation through all parts of the bin.

When an upward current of air is produced by suction, the pump or exhaust will be placed at the top, and when produced by force, the pump or blower will be placed at or connected with the bottom, and *vice versa* when the current of air is reversed.

I have not shown any air-pump or fan-blower, as those of ordinary construction can be used, and, as a general thing, it will not be necessary to construct all of the bins in an elevator or warehouse so as to operate in this manner, for the reason that the grain, when thoroughly dried, may be drawn into other bins.

Having thus fully described my invention,

What I claim as new, and desire to secure by Letters Patent, is—

1. The covered bin A, when provided with an air-space, C, vent-openings E and G, grain-passages F and D, and man-hole I, all constructed and operating substantially as specified.

2. The perforated tubes, when attached to a grain-bin without exterior connection, substantially as and for the purposes specified.

IRA Y. MUNN.

Witnesses:
E. A. WEST,
O. W. BOND.